W. C. SPROUL.
ADJUSTING CUTTER.
APPLICATION FILED SEPT. 28, 1915.

1,208,852.

Patented Dec. 19, 1916.

Witnesses:

Inventor
William C. Sproul
By Pond & Wilson Attys

UNITED STATES PATENT OFFICE.

WILLIAM C. SPROUL, OF ROCKFORD, ILLINOIS, ASSIGNOR TO THE INGERSOLL MILLING MACHINE COMPANY, OF ROCKFORD, ILLINOIS, A CORPORATION OF ILLINOIS.

ADJUSTING CUTTER.

1,208,852.   Specification of Letters Patent.   Patented Dec. 19, 1916.

Application filed September 28, 1915. Serial No. 53,007.

*To all whom it may concern:*

Be it known that I, WILLIAM C. SPROUL, a citizen of the United States, residing at Rockford, in the county of Winnebago and State of Illinois, have invented certain new and useful Improvements in Adjusting Cutters, of which the following is a specification.

The successful and satisfactory operation of milling machines requires an extremely accurate and precise adjustment of the cutters, and variations or inaccuracies in the cut produced amounting to only a few thousandths of an inch will cause the milled article to be rejected and consequently scrapped.

Various measuring and adjusting mechanisms have been devised and applied to milling machines with a view of securing accurate adjustments of the cutters and mechanisms embodying micrometer adjustments have been employed. The fact, however, that all of these adjusting mechanisms are subject to wear, that they have more or less back-lash, and that they embody means wherein a great amount of pressure or strain is involved makes it practically impossible to secure absolute accuracy in the adjustment of the cutters.

The liability of error in the adjustment of one cutter head is, of course, multiplied when the machine comprises a number of cutter heads arranged to operate upon a single surface as, for instance, when the machine is used to mill the top of an automobile crank case, the cutters being set to produce by their conjoint action an absolutely flat surface.

My present invention aims to provide a method of adjustment by which the cutters may be adjusted with absolute accuracy and precision to produce perfect results on the articles operated upon.

To facilitate an understanding of my invention I have illustrated on the accompanying drawings such portions of a milling machine, and the mechanism employed in carrying out my improved method, as are necessary to a clear comprehension of the invention.

Figure 1:
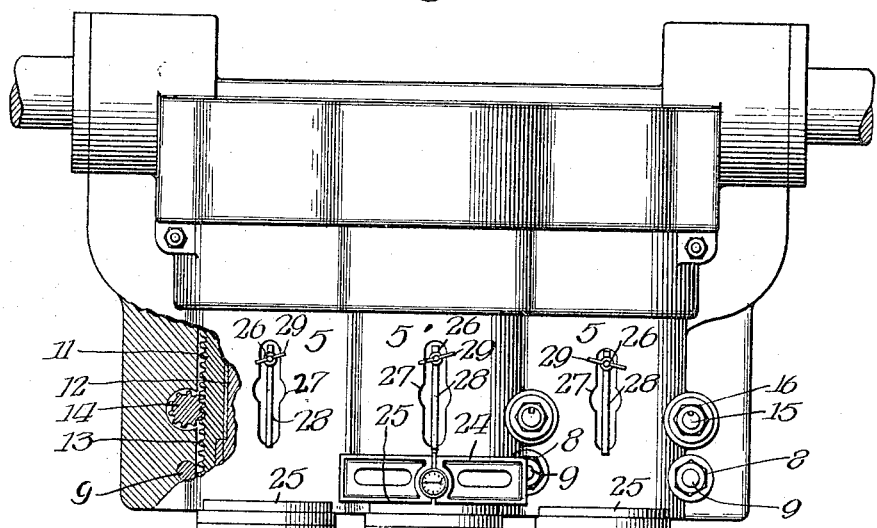
Figure 2:
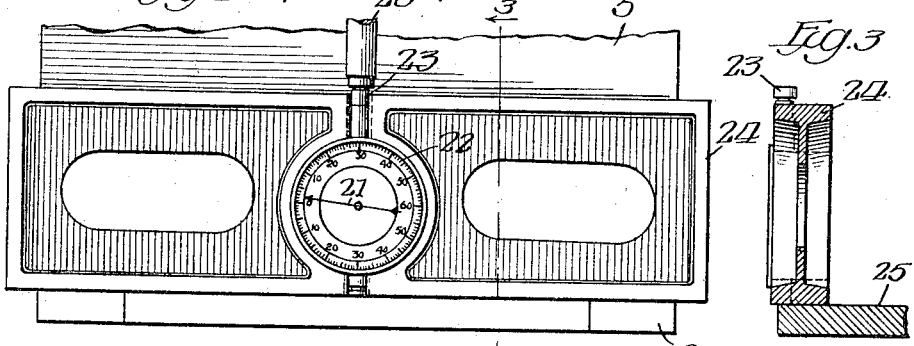
Figure 3:
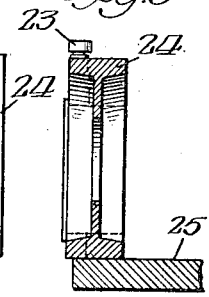
Figure 4:
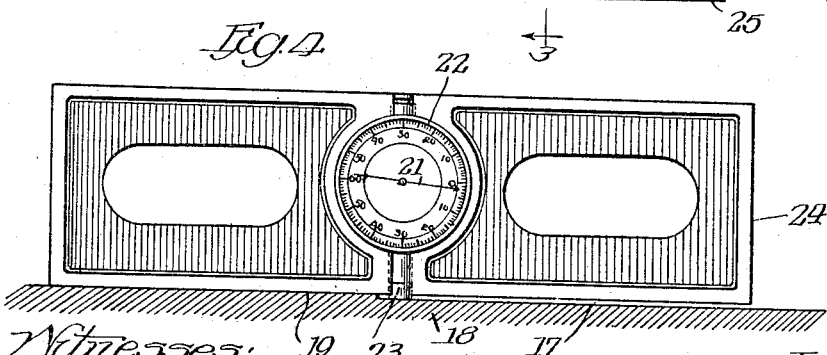

Referring to the drawings, Figure 1 is a fragmentary front elevational view of a multispindle milling machine; Fig. 2 is an enlarged face view showing the position of the dial indicator when an adjustment is being made; Fig. 3 is a sectional view on the line 3—3 of Fig. 2; and Fig. 4 is a view showing the use of the indicator in determining the inaccuracies of the trial blank.

On the drawings reference character 5 indicates the housings in which the spindles carrying the cutter heads 6 equipped with the cutting implements 7 are mounted, the manner of mounting and the mechanism by which the spindles are driven being well known to those skilled in the art. Each housing is slotted longitudinally so that it may be compressed by means of the nuts 8 on the clamping bolts 9 to firmly clamp the spindle sleeves 11 in adjusted position, the spindles 12 being rotatably mounted in sleeves 11 in a well known manner. Each sleeve is equipped with a rack 13 meshing with a pinion 14 carried upon a shaft 15 having a polygonal nut 16 keyed thereon by means of which the shaft may be rotated by applying a wrench to the nut. This manner of raising and lowering the spindles is shown for purposes of illustration merely and it will be obvious that any other preferred mechanism for longitudinally adjusting the spindles may be employed in carrying out my invention.

In the type of machine shown the three cutter heads are required to be set so as to cut in a common plane to produce an absolutely flat milled surface. In order to obtain the accurate adjustment which must be ultimately secured I first set each of the heads to cut approximately to the required depth and in approximately a common plane. One of the objects or articles to be milled is then run through the machine and subjected to the action of the three cutters. This object or article, which I term a trial blank, is then used in determining the amount that each of the heads must be adjusted to bring them into the required position to produce absolutely accurate work.

In determining the inaccuracies in the milled surface of the trial blank I first measure the height of one of the surfaces produced by one of the heads from a fixed base line to determine whether this particular head requires any further adjustment, and from this surface as a basis I determine the amount of adjustment required by the other heads in the following manner: Let us assume, viewing Fig. 4, that the surface 17 of the trial blank 18 was produced by the right hand cutter, viewing Fig. 1, and that the surface 19 was produced by the center cutter, the surface produced by the left hand cutter being omitted from the drawings. I now take a standard dial indicator, which is a well known commercial article comprising a pointer 21 operating over a dial face 22 graduated to thousandths, the pointer being swung about its pivot by longitudinal movement of a finger 23 which is normally projected beyond the surface of the frame 24 by means of spring mechanism incorporated in the indicator structure. When the frame is placed upon an absolutely flat surface the end of the finger 23 will be pushed inwardly until it is flush with the lower face of the frame, in which position the pointer will indicate the zero on the dial. In moving the frame around upon the surface if a depression should be encountered the finger 23 will be projected into the depression and the pointer will indicate on the dial the number of thousandths of an inch that the depression lies below the surface upon which the frame 24 rests. This indicator is moved over the milled surface of the trial blank and any depressions in the surface will be indicated by the pointer. If the right hand cutter, viewing Fig. 1, is cutting deeper than the center cutter the difference in depth of cut will be indicated when the frame is in the position shown in Fig. 4. That is, in moving the indicator frame over the surface of the trial blank the operator will observe that the surface 17 is .002 of an inch below the surface 19. If the initial measurement from the base line has shown that the surface 17 is at exactly the required height the right hand cutter will obviously require no further adjustment. The indicator, however, shows .002 of an inch difference between the cuts produced by the right hand cutter and the central cutter, therefore, the central cutter must be adjusted downwardly .002 of an inch. The dial indicator is used in a similar manner to determine the relative heights of the cuts produced by the central cutter and the left hand cutter; and having determined the amount of adjustment required by the central cutter the amount, if any, required by the left hand cutter can be readily ascertained by the use of the indicator.

Having now determined that the central cutter requires a downward adjustment of .002 of an inch I employ the dial indicator in the adjusting operation to obtain an absolutely accurate adjustment of this cutter. With this end in view I have mounted upon the casing or housing of each spindle a shelf 25 which projects forwardly a sufficient distance to form a support upon which the indicator frame may be positioned. Upon the spindle sleeve 11 of each spindle I have provided a forwardly extending arm 26 which projects through a slotted opening 27 in the forward wall of the housing above the shelf 25. Each arm 26 is equipped with a downwardly projecting finger 28 which may be adjusted vertically on its respective arm and locked in adjusted position by a set screw 29.

Having determined, as previously explained, that the center cutter head requires a downward adjustment of .002 of an inch the dial indicator is then placed upon the shelf 25 in inverted position; that is, with the finger 23 projecting upwardly as shown in Figs. 1, 2 and 3. The finger 28 is then released by loosening the set screw 29 and moved downwardly into contact with the finger 23 so that some pressure is exerted upon finger 23, the exact amount of pressure and the position of the pointer caused by downward movement of the finger 23 being immaterial. The purpose of causing the finger 28 to contact with the finger 23 is to insure that any vertical movement of finger 28 will be indicated on the dial. The finger 28 is then securely locked to its arm 26 by the set screw 29, the arm 26, as previously explained, being rigidly attached to the spindle sleeve. It will then be obvious that any longitudinal movement of the spindle will be transmitted directly through the rigid arm 26 and finger 28 to the finger 23 and that the amount of movement will be registered on the dial.

Assuming now that when the parts are positioned as just explained, the pointer on the indicator points to .002 on the dial, obviously to effect the .002 of an inch downward adjustment of the spindle it will be necessary to move the spindle downwardly until the pointer on the indicator points to .004. This downward movement is made by turning the shaft 15 the required amount after which the spindle is locked in its adjusted position by tightening up the nut 8. The required amount of adjustment for the left hand spindle having been previously ascertained as described, the indicator is now moved over to the left shelf 25, the finger 28 is locked against the indicator finger 23 and the required adjustment of this spindle is then made.

It will be obvious that by my improved method I am enabled to determine the exact amount of movement of the cutter spindle itself, and therefore absolutely accurate adjustments can be made irrespective of any back-lash or wear of the adjusting mechanisms. The dial indicator which I employ serves primarily to determine the amount of adjustment required and then acts as an indicator in direct connection with the spindle to show the exact amount of movement of the spindle. It should be understood in this connection that the mechanical details shown and described have been selected for purposes of illustration merely and that my improved method may be carried out to secure absolutely accurate cutter adjustments by means of other mechanisms than those disclosed herein.

I claim:

1. The method of adjusting cutters which consists in preliminarily adjusting the cutters to approximately the desired position, milling a blank with the approximately adjusted cutters, determining by a dial indicator the amount of inaccuracy of the milled surface of said blank, supporting the indicator in position to be operated by movement of a cutter requiring adjustment, and then adjusting said cutter an amount, which shown by the indicator, will eliminate the inaccuracy previously determined.

2. The combination of an axially adjustable cutter, a stationary support, a dial indicator positioned on said support, and a member connected to and movable with the cutter and positioned to operate said indicator directly by axial movement of the cutter whereby the extent of movement of the cutter is indicated by said indicator.

WILLIAM C. SPROUL.

Copies of this patent may be obtained for five cents each, by addressing the "Commissioner of Patents, Washington, D. C."